UNITED STATES PATENT OFFICE.

WILLIAM M. MYERS, OF HANNIBAL, MISSOURI.

BEVERAGE.

SPECIFICATION forming part of Letters Patent No. 471,879, dated March 29, 1892.

Application filed July 8, 1891. Serial No. 398,800. (No specimens.)

*To all whom it may concern:*

Be it known that I, WILLIAM M. MYERS, of Hannibal, in the county of Marion and State of Missouri, have invented a new and useful Improvement in Beverages, of which the following is a specification.

This invention relates to an improved nonintoxicating beverage for medicinal purposes, the object of the invention being to so combine the ingredients as to produce a pleasant effervescent beverage possessing various medicinal qualities.

My invention consists in the particular ingredients employed and the manner of compounding or mixing the same, as will be more fully hereinafter described and claimed.

In compounding my beverage I employ onethird of a pound of hops, which is boiled in two gallons of water for one-half an hour and the boiling mixture then filtered through a cloth. The filtrate or extract of hops is then placed in a receptacle capable of holding about eight gallons, and to this filtrate is added one pint of starch, which gives the beverage the consistency of milk, and to the hop filtrate and starch is added one-half a gallon of old cane molasses, which, after being fermented, has the combined effects of a laxative and effervescent. One and one-third ounces fluid extract of sarsaparilla is then added and also sixteen teaspoonfuls of citrate of magnesia. One ounce of turmeric is then added to give the beverage the color or cream and sufficient water to make the mixture amount to eight gallons. After this one pint of bakers' yeast is added or a small piece of yeast-cake to produce fermentation. The mixture is then corked tightly and allowed to remain for about forty-eight hours, after which it is drawn off into bottles or kegs and a raisin or two placed in each bottle, or in the keg one raisin to the pint.

This beverage has the appearance of ordinary beer, but is much more pleasant to the taste and possesses medicinal properties not to be found in the beer, the acetate of magnesia acting as refrigerant and laxative, the starch as a nutritive compound, the sarsaparilla as an alterative blood tonic, and the hops as a general tonic.

Having thus described my invention, what I claim is—

An improved medicinal beverage consisting of one-third of a pound of hops boiled in water and filtered, one pint of starch about the consistency of milk, which is added to this hop filtrate, one-half gallon of old cane molasses, one and one-third fluid ounces extract of sarsaparilla, and sixteen teaspoonfuls of citrate of magnesia, one ounce of turmeric, and sufficient water to make up a mixture of eight gallons, one pint of bakers' yeast, and the raisins, all incorporated substantially as described.

WILLIAM M. MYERS.

Witnesses:
C. M. DAVIS,
C. D. LAKE.